LINEAR DEFLECTION SYSTEM

Filed Oct. 14, 1955

2,890,381
Patented June 9, 1959

2,890,381

LINEAR DEFLECTION SYSTEM

John Sinnott, Levittown, N.Y., assignor to Hazeltine Research, Inc., Chicago, Ill., a corporation of Illinois Application October 14, 1955, Serial No. 540,523
6 Claims. (Cl. 315—27)

*General*

This invention relates to linear deflection systems for deflecting a cathode-ray tube beam and, particularly, to such systems which utilize negative or degenerative feedback for improving the linearity of the beam deflection.

Many types of cathode-ray tube displays are known to those skilled in the art. A feature that is common to most types of displays is that the reproduced image is built up by causing the electron beam of the cathode-ray tube to scan or sweep across the display screen of the tube in a repetitive manner, successive beam scans being slightly displaced from one another so as to produce a complete image. Generally speaking, in order to faithfully reproduce the desired image, each beam scan must be linear, that is, the velocity of the electron beam across the display screen must be constant. In the case of a magnetic deflection system, that is, one where the beam deflection is caused by a magnetic field produced by a suitable deflection coil placed adjacent the neck of the cathode-ray tube, this requirement of linearity means that the driving current supplied to the deflection coil must, for each beam scan, increase in a perfectly linear manner as a function of time. In other words, the driving current must have the usual saw-tooth wave form and the active scanning portions thereof must be linear.

In deflection systems which do not use negative feedback, it has been heretofore proposed to produce a saw-tooth type driving current for the deflection coil of a deflection system by first developing a saw-tooth voltage which is then applied to an output stage employing an amplifier tube of the pentode type which converts the saw-tooth voltage to a corresponding linear saw-tooth current which, in turn, is applied to the deflection coil. Among other things, this scheme suffers from the disadvantage that it is exceedingly difficult to produce the required saw-tooth voltage. Also, it is difficult to compensate for the various sources of distortion that may be present in a system of this type.

In order to reduce the distortion present in a cathode-ray tube beam-deflection system and thereby improve the linearity of the beam scan, various negative feed-back schemes have been proposed whereby a part of the signal at the output terminals of the amplifier portion of the deflection system is fed back to the input or an intermediate stage of the amplifier. The known distortion-reducing characteristics of negative feed-back operation thus help, to some extent, to minimize the distortion caused by the amplifier portion of the deflection system, but such feed-back systems as heretofore proposed have been more complex than is generally desirable, especially in the case of television receivers. Also, the deflection coil itself is not included in the feed-back circuit and, hence, for the case of current feed-back, the feed-back operation does not help to minimize the distortion that may be introduced by the customary damping resistor, or by the distributed capacitance of the deflection coil, or by screen-current effects in the case of a pentode driver. For the case of voltage feedback, on the other hand, rather precise networks are required to ensure that the feed-back signal will have the same wave form as the input signal, owing to the finite resistance of the deflection coil.

Apart from negative feed-back considerations, the design of a linear deflection system would be much simplified if a rectangular voltage signal were initially supplied to the input of the deflection-signal amplifier. This results because it is, in general, considerably easier to generate perfectly rectangular wave forms than it is to generate perfectly linear saw-tooth wave forms. In deflection systems which do not use negative feedback, a rectangular voltage signal cannot be utilized in the greater majority of cases because the output stage of the deflection-signal amplifier of such systems is generally of the voltage-to-current converter type which utilizes a pentode-type amplifier tube and, hence, of necessity, requires a saw-tooth driving voltage in order to produce a saw-tooth output current. In the case of an output stage which is not of the voltage-to-current converter type, for example, an output stage which utilizes a triode-type amplifier tube, a saw-tooth driving voltage component is generally needed to compensate for the saw-tooth voltage drop across the internal plate resistance of the tube as well as the finite resistance of the deflection coil.

A linear deflection system constructed in accordance with the present invention circumvents the foregoing limitations and enables the use of a rectangular voltage signal by utilizing a novel and relatively simple feed-back circuit which includes the magnetic deflection flux of the deflection coil in the feed-back circuit. In addition to enabling the use of rectangular voltage signals, the fact that the deflection flux itself is included in the feed-back circuit means that the entire output portion of the deflection system is subjected to the well-known distortion-reducing properties of negative feed-back operation thereby improving the linearity of the electron-beam deflection.

It is an object of the invention, therefore, to provide a new and improved linear deflection system which substantially avoids one or more of the foregoing limitations of such systems heretofore proposed.

It is another object of the invention to provide a new and improved linear deflection system of relatively simple construction whereby the difficulty of developing a linear saw-tooth voltage for driving the amplifier portion of the deflection system is eliminated by utilizing a driving voltage of rectangular wave form.

It is a further object of the invention to provide a new and improved linear deflection system of the negative feed-back type wherein the magnetic deflection flux of the deflection coil is included in the feed-back circuit for improving the linearity of the electron-beam deflection.

In accordance with the invention a linear deflection system for deflecting a cathode ray tube beam, the system comprises a cathode-ray tube having a display screen and means for producing an electron beam. The system also includes a rectangular signal generator for generating a rectangular signal corresponding to the derivative of the desired saw-tooth deflection current and an amplifier circuit responsive to the rectangular signal for developing a deflection current. In addition, the system includes a deflection coil responsive to the deflection current for deflecting the electron beam across the display screen and circuit means responsive to the variations of the deflection current for developing a feed-back signal representative of the derivative of the actual deflection current. The system finally includes circuit means for supplying the feed back signal back to the input of the amplifier circuit with a polarity opposite to that of the first-mentioned rectangular signal to thereby cause the deflection current supplied to the deflection coil to have a very nearly linear saw-tooth wave form.

For a better understanding of the present invention, together with other and further objects thereof, reference is had to the following description taken in connection with the accompanying drawings, and its scope will be pointed out in the appended claims.

Referring to the drawings.

Figure 1:
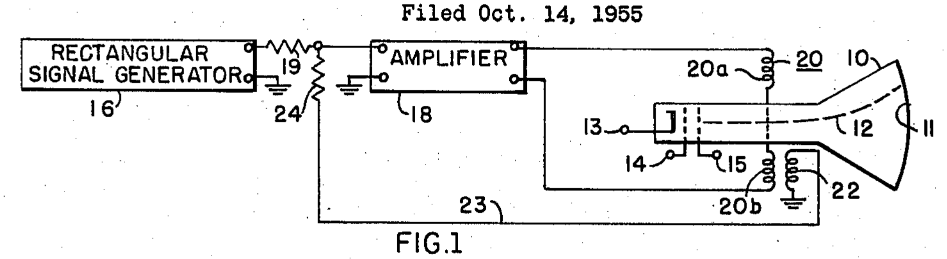
Fig. 1 is a circuit diagram, partly schematic, of a linear deflection system constructed in accordance with the present invention.

*Description of linear deflection system of Fig. 1*

Referring to Fig. 1 of the drawings, there is shown a linear deflection system constructed in accordance with the present invention for deflecting a cathode-ray tube beam. This system comprises a cathode-ray tube 10 having a display screen 11 and means for producing an electron beam, the electron beam being represented diagrammatically by the dashed line ray 12. The means for producing an electron beam may include a cathode 13, control electrode 14, and accelerating electrode 15. In operation, these electrodes 13–15, inclusive, may be coupled to suitable signal- and voltage-supply circuits (not shown) of the apparatus in which the linear deflection system is incorporated. It is apparent that a linear deflection system in accordance with the present invention may be utilized in a wide variety of electronic apparatus such as, for example, television receivers and radar indicators.

The linear deflection system also includes circuit means for developing a beam-deflection signal. This circuit means includes first circuit means for supplying a rectangular control signal and may include the rectangular signal generator 16. The generator 16 may be of any conventional type such as, for example, a synchronized multivibrator. The circuit means for developing a beam-deflection signal also includes second circuit means responsive to the rectangular control signal supplied, for example, by the generator 16 for developing a beam-deflection signal. This second circuit means may include, for example, an amplifier 18 of conventional construction. Depending on the nature of the apparatus wherein the linear deflection system is utilized as well as the size of the cathode-ray tube 10, the amplifier 18 may comprise a single amplifier stage or it may include several such stages. The amplifier 18 is coupled to the rectangular signal generator 16 by way of a coupling resistor 19.

The linear deflection system further includes a deflection coil 20 which is responsive to the beam-deflection signal supplied by the amplifier 18 for deflecting the electron beam 12 across the display screen 11. As shown in Fig. 1, the deflection coil 20 may include an upper winding portion 20*a* and a lower winding portion 20*b* which are positioned adjacent the neck of the cathode-ray tube 10 for repetitively deflecting the electron beam across the display screen 11. The well-known orthogonal relationship between the direction of a magnetic field and the direction of electron-beam deflection, of course, indicates that a vertical magnetic field, such as produced by the deflection coil 20, will cause a horizontal deflection of the electron beam 12. Accordingly, a deflection coil positioned as shown in Fig. 1 is effective for producing horizontal deflection (not apparent in the drawings) of the electron beam 12. In order to build up an image, beam deflection is often required in both vertical and horizontal directions. Accordingly, a second deflection coil (not shown) may be positioned at right angles to the deflection coil 20 of Fig. 1 and such second deflection coil may be embodied in a linear deflection system constructed in accordance with the present invention or, in the alternative, it may be embodied in a conventional type of deflection system. The form of the deflection coil 20 as shown in Fig. 1 is intended as diagrammatic only, as the deflection coil may be of either of the well-known saddle yoke or toroidal forms.

The linear deflection system of the present invention additionally includes means responsive to the magnetic-field variations developed by the deflection coil 20 for supplying a degenerative feed-back signal back to the circuit means for developing a beam-deflection signal for improving the linearity of the deflection of the electron beam 12. This means includes a pickup coil 22 positioned adjacent the deflection coil 20 and responsive to the magnetic-field variations developed by the deflection coil 20 for supplying a degenerative feed-back signal of rectangular wave form back to the input of the amplifier 18 for improving the linearity of the electron-beam deflection. In addition to the pickup coil 22, the feed-back path also includes a conductor 23 and a coupling resistor 24, the coupling resistor 24 being connected to the input of the amplifier 18. The pickup coil 22 is connected so that the polarity of the signal fed back to the input of the amplifier 18 is opposite to that of the signal supplied to the amplifier 18 by the rectangular signal generator 16. The pickup coil 22 is, for simplicity, shown as being adjacent only the lower winding portion 20*b*. This is intended to be only representative because, in practice, it will frequently be desirable to have the pickup coil adjacent both winding portions.

Where, for example, the deflection coil 20 is contained in a saddle yoke type of deflection assembly, the pickup coil 22 may comprise a few turns of wire positioned within the yoke assembly adjacent an appropriate one of the saddle yoke windings. As an alternative, the pickup coil 22 need not take the form of a separate winding as shown in Fig. 1 but may comprise a few of the end turns of the deflection coil 20 itself so as to obtain autotransformer coupling.

*Operation of linear deflection system of Fig. 1*

Considering now the operation of the linear deflection system just described, the operation of this system is based on the well-known fact that the voltage developed across a pure inductor is proportional to the rate of change of the current flowing through the inductor $$\left(e=L\frac{di}{dt}\right)$$

Thus, when the current changes at a constant rate in an inductor, the voltage across the inductor must remain constant. The linearly rising portion of a saw-tooth current signal for example, represents a current changing at a constant rate and, hence, the voltage across the inductor must be constant during this linearly rising portion which represents, for example, the active scanning or trace portion of the saw tooth. Because the saw-tooth current signal also contains a more or less linear portion having a slope of opposite polarity during the retrace intervals, a second voltage level is produced across the inductor during these intervals. Thus, when a saw-tooth current is flowing through a pure inductor, the voltage developed thereacross is of rectangular wave form.

In a converse manner, when a voltage of constant amplitude is suddenly applied across an unenergized inductor, the current flow therethrough must increase in a linear manner, the rate of increase being determined by the amplitude of the applied voltage and the inductance of the inductor. Thus, the application of a rectangular voltage wave form across a pure inductor causes the current flow therethrough to be of a saw-tooth wave form.

Figure 2:
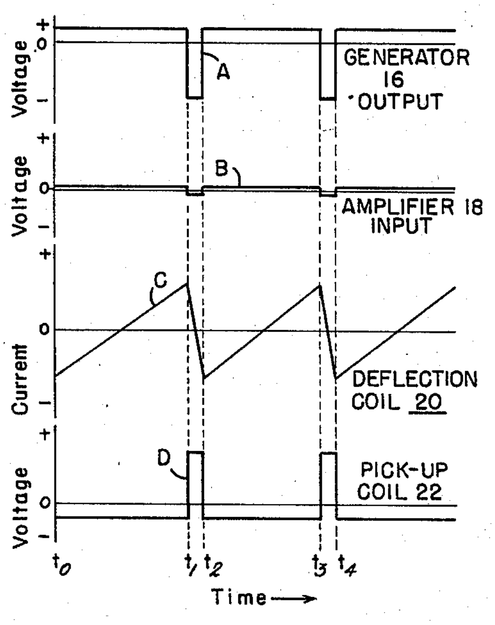
Figs. 2 and 3 are graphs representing signals that may be developed at various points of the Fig. 1 system and are used in explaining the operation thereof.

Applying these principles to the linear deflection system of Fig. 1, the rectangular signal generator 16 supplies a rectangular voltage signal as represented, for example, by curve A of Fig. 2 to the input resistor 19 of the amplifier 18. The amplifier 18 is effective to amplify the rectangular voltage signal (curve B) and apply it across the deflection coil 20. As a result, a current of saw-tooth wave form as represented by curve C of Fig. 2 is caused to flow through the deflection coil 20. The magnetic flux developed by the deflection coil 20 is, of course, of the same wave form as the current flow therethrough. Accordingly, part of the magnetic flux developed by the deflection coil 20 passes through the pickup coil 22 and is effective to cause a voltage of rectangular wave form to be developed across the pickup coil 22, this voltage being represented by curve D of Fig. 2. This voltage signal across the pickup coil 22 is then fed back by way of the coupling resistor 24 to the input of amplifier 18 thereby producing the desired feed-back operation of the deflection system.

It will be noted that the rectangular voltage represented by curve D is of opposite polarity to the initial input voltage represented by curve A so that, when the voltage represented by curve D is supplied back to the input of the amplifier 18, "negative" feed-back operation of the deflection system is obtained. It will be also noted that the feed-back signal represented by curve D has a first amplitude value during the active scanning or trace intervals represented, for example, by the intervals $t_0$–$t_1$ and $t_2$–$t_3$ of Fig. 2, while it has a second amplitude value during the retrace intervals $t_1$–$t_2$ and $t_3$–$t_4$. The magnitudes of these amplitude values or levels are, of course, dependent on the slope of the corresponding portions of the saw-tooth current signal.

As is well known, negative feed-back operation of a signal-translating system has the beneficial characteristic that any signal distortion produced by any of the circuits within the feed-back system is automatically reduced. This is because of the fact that if the output signal wave form deviates from the wave form of the input signal, then this deviation is supplied back to the input of the system with reverse polarity so as to cancel or annul the deviation. Of course, in the case of signal-amplifying circuits, the use of negative feedback tends to reduce the over-all gain of the circuit so that a greater gain may be required of the amplifier circuit than is necessary where negative feedback is not utilized. This reduction in gain depends on the feed-back factor of the circuit, that is, the amount or magnitude of the signal which is fed back compared to the signal originally applied to the input thereof. In the case of the linear deflection system of Fig. 1, the feed-back signal represented by curve D of Fig. 2 is of amplitude slightly less than the amplitude of the signal supplied by the generator 16 and represented by curve A of Fig. 2. As a consequence, the signal present at the input of the amplifier 18, that is, at the junction of the coupling resistors 19 and 24 is a rectangular signal of very small amplitude as represented by curve B of Fig. 2. It is, in effect, this small amplitude difference signal which is amplified by the amplifier 18 to produce the desired output signal for driving the deflection coil 20. Because of the fact that the magnetic-field variation or magnetic flux developed by the deflection winding 20 is included in the feed-back circuit, the entire output portion of the deflection system from the amplifier 18 on is under the control of negative feedback, thereby improving the linearity of the deflection of the electron beam 12.

Figure 3:
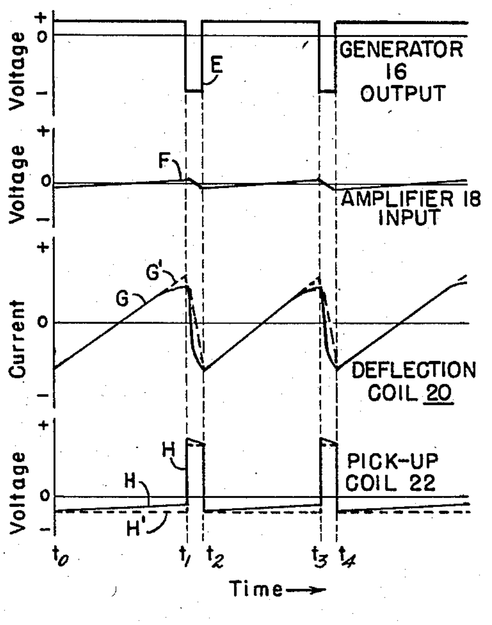

There are two important cases where the wave forms of Fig. 2 are not wholly accurate. One of these is where the output or last stage of the amplifier 18 utilizes a pentode-type amplifier tube and, hence, requires a saw-tooth driving voltage in order to develop a saw-tooth output current. The other case is where the output stage of the amplifier 18 utilizes a triode-type amplifier tube and the internal plate resistance of the tube and the finite resistance of the deflection coil 20 must be taken into account. Accordingly, reference is had to the curves of Fig. 3 which are more nearly accurate in explaining the operation of the system where a pentode-type tube is used to drive the deflection coil 20. As before, a rectangular voltage signal, represented by curve E of Fig. 3, is applied to the input of the amplifier 18 and an approximately saw-tooth wave form as represented by curve G is produced in the deflection coil 20. Similarly, an approximately rectangular wave form, as represented by curve H, is developed across the pickup coil 22 and fed back to the input of the amplifier 18.

Assuming, for example, that the output or last stage of the amplifier 18 employs a pentode-type amplifier tube, then it is necessary that the voltage signal supplied to the control electrode thereof be of saw-tooth wave form in order to produce the saw-tooth deflection current. This is because a high-impedance pentode-type tube acts as a voltage-to-current converter developing an output current which is proportional to the voltage supplied to the control electrode thereof. The required saw-tooth voltage for driving the output stage is developed by the dynamic operating properties of the feed-back circuit as a whole. In other words, the inherent nature of negative feed-back operation causes the circuit to develop a feed-back signal which is as nearly a replica of the original input signal as is possible. This occurs when a saw-tooth component is present in the signal supplied to the control electrode of the output stage. Accordingly, when the feed-back circuit is in its equilibrium condition, the feed-back voltage developed across the pickup coil 22 contains a slight saw-tooth component as represented by the departure of the solid line curve H from the perfectly rectangular dashed line curve H′. Thus, when this opposite polarity feed-back signal combines with the original input signal represented by curve E, there results a small amplitude difference signal of saw-tooth wave form as represented by curve F at the junction of the resistors 19, 24. This saw-tooth signal as represented by curve F, while initially of small amplitude, is subsequently amplified by the amplifier 18 thereby producing the required saw-tooth voltage at the control electrode of the output stage which, in turn, produces the desired saw-tooth current. Because the saw-tooth voltage difference signal represented by curve F need only be of small amplitude, the resulting departure of the feed-back signal represented by curve H from a purely rectangular wave form is small, the actual magnitude of this departure depending on the initial amplitude required of the saw-tooth voltage difference signal represented by curve F. This voltage difference amplitude, in turn, depends on the amount of gain afforded by the initial portions of the amplifier 18. Accordingly, the departure of the feed-back signal represented by curve H from a rectangular wave form may be decreased by increasing the gain of the amplifier 18.

The presence of a saw-tooth component in the voltage signal developed across the pickup coil 22, of course, requires that the current flow through the deflection coil 20 depart from a perfectly linear value towards the ends of each individual sloping portion. This departure from linearity is indicated by the departure of the solid line curve G from the ideal saw-tooth wave form represented by the dashed line curve G′. As mentioned, the magnitude of this nonlinearity may be decreased by increasing the gain of the amplifier 18. In practice, the degree of nonlinearity is slight so that over-all linearity of the electron-beam deflection is substantially improved over that obtainable with deflection systems heretofore proposed.

Similar considerations apply in the case of a triode-type driver where a saw-tooth voltage component is required to be supplied to the output stage of the amplifier 18 in order to compensate for the saw-tooth voltage drops across the internal plate resistance of the triode-type amplifier tube of this stage and the finite resistance of the deflection coil 20. In general, however, the saw-tooth requirements are not as severe in this situation and, accordingly, for a given amount of gain the departure from linearity is less than in the previously mentioned case.

Figure 4:
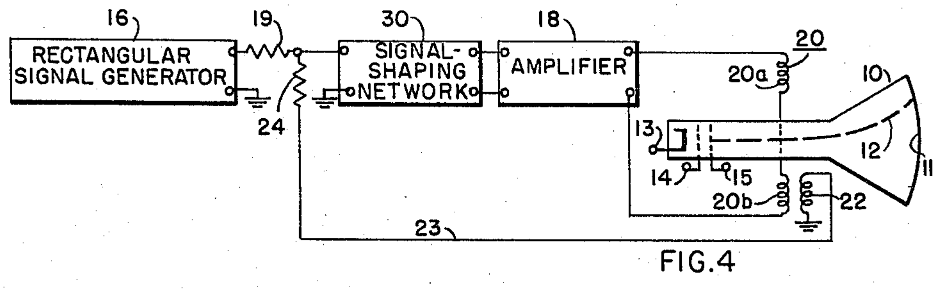
Fig. 4 is a circuit diagram, partly schematic, of a modification of the linear deflection system of Fig. 1.

*Description and operation of modified linear deflection system of Fig. 4*

Referring now to Fig. 4 of the drawings, there is shown a modified and, perhaps, preferable form of the linear deflection system of Fig. 1. This Fig. 4 system is very similar to that of Fig. 1 and, therefore, the same reference numerals have been utilized to refer to corresponding elements in the two figures. The feature of the Fig. 4 system is that it serves to eliminate even the slight departure from nonlinearity which may occur in the mentioned situations when using a linear deflection system in accordance with Fig. 1. This improvement is achieved by utilizing a signal-shaping network 30 in the amplifier channel between the generator 16 and the deflection coil 20.

The signal-shaping network 30 may take the form of a conventional integrating circuit for developing a saw-tooth voltage output when a rectangular voltage signal is supplied to the input thereof. This network 30 is thus utilized to develop the saw-tooth signal component which is necessary in the cases where such a component is required at the control electrode of the output stage of the amplifier 18. In other words, the feed-back circuit is made to operate as illustrated by the curves of Fig. 2. In this manner, a small rectangular difference signal, as represented by curve B, results at the junction between the coupling resistors 19 and 24. This small rectangular signal is then integrated by the signal-shaping network 30 to produce a saw-tooth voltage signal which is then amplified by the initial portions of the amplifier 18 in order to supply the required saw-tooth voltage to the control electrode of the output stage thereof. In this manner, the dynamic operating characteristics of the whole feed-back circuit need not be utilized to develop the saw-tooth current and, hence, the feed-back signal developed across the pickup coil 22, as represented by curve D of Fig. 2, is of perfectly rectangular wave form. This, in turn, means that the current flow through the deflection coil 20 as represented by curve C of Fig. 2 is perfectly linear, thereby developing a linear deflection of the electron beam 12.

Figure 5:
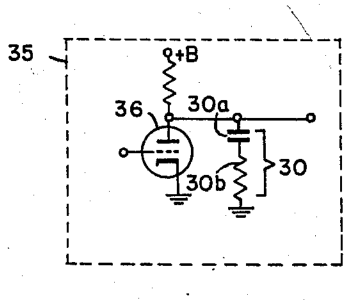
Fig. 5 is a detailed circuit diagram of a circuit which may be utilized in the linear deflection system of Fig. 4.

The simplicity of practical forms of the network which may be utilized as the signal-shaping network 30 of Fig. 4 cannot be overemphasized. In some cases, this signal-shaping network 30 may consist of nothing more than an integrating condenser coupled across the input of the amplifier 18. Also, it is not essential that the signal-shaping network 30 be placed at the input of the amplifier 18 and, in fact, this network may be positioned at some intermediate point within the amplifier 18 itself. This is illustrated by the one-stage amplifier circuit 35 shown in Fig. 5. In this case, the integrating network 30 comprises a condenser 30*a* and a resistor 30*b* coupled between the output electrode of an amplifier tube 36 and ground. Obviously, this amplifier circuit 35 may comprise one stage of the amplifier 18.

As a consequence of enabling a perfectly linear saw-tooth current flow to be developed through the deflection coil 20, the use of a signal-shaping network 30 also considerably reduces the signal gain required of the amplifier 18. In other words, this amplifier 18 need not have a high degree of gain simply for the sake of reducing the saw-tooth component of the feed-back voltage developed across the pickup coil 22 because such a saw-tooth component is no longer present in the feed-back voltage developed across the pickup coil 22.

From the foregoing descriptions of the various embodiments of the invention it will be apparent that a linear deflection system constructed in accordance therewith circumvents the difficulty of developing a linear saw-tooth voltage for driving the amplifier portion of the deflection system by utilizing instead a driving voltage of rectangular wave form. Also, because the magnetic deflection flux of the deflection coil itself is included in the feed-back circuit, the linearity of the electron-beam deflection is improved.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; an amplifier circuit responsive to the rectangular signal for developing a deflection current; a deflection coil responsive to the deflection current for deflecting the electron beam across the display screen; circuit means responsive to the variations of the deflection current for developing a feedback signal representative of the derivative of the actual deflection current; and circuit means for supplying the feedback signal back to the input of the amplifier circuit with a polarity opposite to that of the first-mentioned rectangular signal to thereby cause the deflection current supplied to the deflection coil to have a very nearly linear saw-tooth wave form.

2. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; an amplifier circuit including a pentode-type output stage and responsive to the rectangular signal for developing a deflection current, the use of the pentode-type output stage tending to cause the deflection current to be of other than the desired saw-tooth wave form; a deflection coil responsive to the deflection current for deflecting the electron beam across the display screen; circuit means responsive to the variations of the deflection current for developing a feedback signal representative of the derivative of the actual deflection current; and circuit means for supplying the feedback signal back to the input of the amplifier circuit with a polarity opposite to that of the first-mentioned rectangular signal to thereby cause the deflection current supplied to the deflection coil to have a very nearly linear saw-tooth wave form.

3. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; an amplifier circuit responsive to the rectangular signal for developing a deflection current; a deflection coil responsive to the deflection current for deflecting the electron beam across the display screen; circuit means responsive to the variations of the deflection current for developing a feedback signal representative of the derivative of the actual deflection current; a circuit means for supplying the feedback signal back to the input of the amplifier circuit with a polarity opposite to that of the first-mentioned rectangular signal to thereby cause the deflection current supplied to the deflection coil to have a very nearly linear saw-tooth wave form; and the amplifier circuit including an integrating network for modifying the difference signal resulting from the two input signals to further improve the linearity of the saw-tooth deflection current for a given amount of amplifier gain.

4. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; an amplifier circuit responsive to the rectangular signal for developing a deflection current; a deflection coil responsive to the deflection current for deflecting the electron beam across the display screen; a pickup coil responsive to the magnetic-field variations of the deflection coil for developing a signal representative of the derivative of the actual deflection current; and circuit means for supplying the pickup coil signal back to the input of the amplifier circuit with a polarity opposite to that of the first-mentioned rectangular signal to thereby cause the deflection current supplied to the deflection coil to have a very nearly linear sawtooth wave form.

5. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; a resistor adding network coupled to the output of the rectangular signal generator; an amplifier circuit coupled to the output of the adding network and responsive to the output signal therefrom for developing a deflection current; a deflection coil responsive to the deflection current for deflecting the electron beam across the display screen; a pickup coil responsive to the magnetic-field variations of the deflection coil for developing a signal representative of the derivative of the actual deflection current; and a conductor connecting the pickup coil to the adding network so that the pickup coil signal is supplied thereto with a polarity opposite to that of the first-mentioned rectangular signal to thereby cause the deflection current supplied to the deflection coil to have a very nearly linear saw-tooth wave form.

6. A linear deflection system for deflecting a cathode-ray tube beam, the system comprising: a cathode-ray tube having a display screen and means for producing an electron beam; a rectangular signal generator for generating a rectangular signal corresponding to the derivative of the desired saw-tooth deflection current; a resistor adding network coupled to the output of the rectangular signal generator; an amplifier circuit coupled to the output of the adding network and responsive to the output signal therefrom for developing a deflection current; a deflection coil responsive to the deflection current for deflecting the electron beam across the display screen; a pickup coil responsive to the magnetic-field variations of the deflection coil for developing a signal representative of the derivative of the actual deflection current; a conductor connecting the pickup coil to the adding network so that the pickup coil signal is supplied thereto with a polarity opposite to that of the first-mentioned rectangular signal to thereby cause the deflection current supplied to the deflection coil to have a very nearly linear saw-tooth wave form; and the amplifier circuit including an integrating network for modifying the difference signal coming from the adding network to further improve the linearity of the saw-tooth deflection current for a given amount of amplifier gain.

References Cited in the file of this patent

UNITED STATES PATENTS

| | | |
|---|---|---|
| Re. 23,909 | Setchell | Dec. 14, 1954 |
| 2,077,574 | Maloff | Apr. 20, 1937 |
| 2,521,741 | Parker | Sept. 12, 1950 |
| 2,627,052 | Helpert et al. | Jan. 27, 1953 |
| 2,654,855 | Denton | Oct. 6, 1953 |
| 2,728,875 | Kihn | Dec. 27, 1955 |
| 2,729,766 | Vilkomerson | Jan. 3, 1956 |
| 2,743,382 | Lufkin | Apr. 24, 1956 |